Dec. 29, 1959  C. E. WEST  2,919,140
SAFETY DEVICE FOR MOTOR VEHICLES
Original Filed May 6, 1957
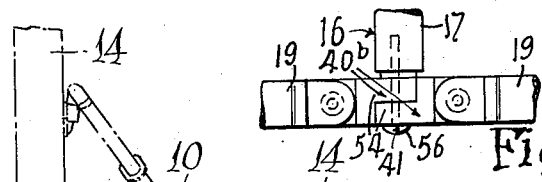
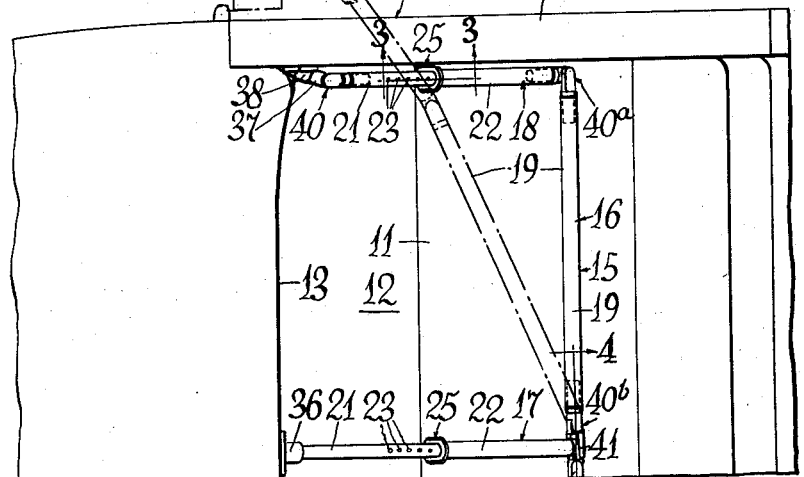
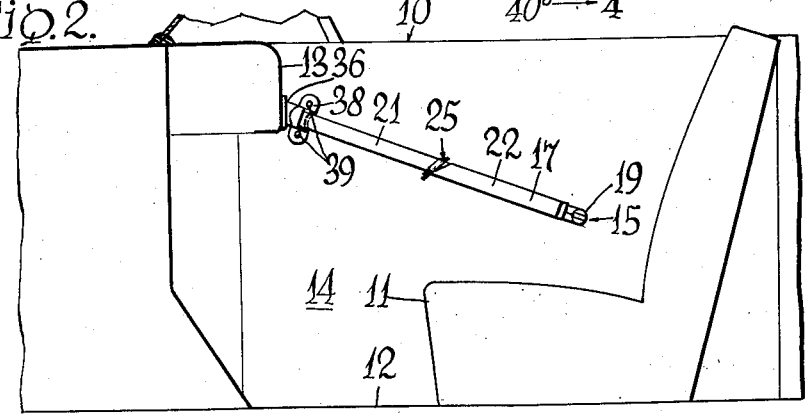
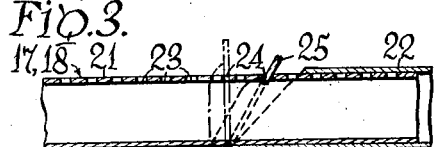
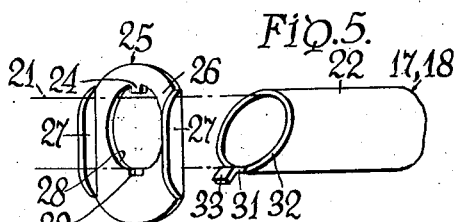
INVENTOR.
Charles E. West,
BY
Raymon E. Rousseau
ATTORNEY

United States Patent Office 2,919,140
Patented Dec. 29, 1959

2,919,140

SAFETY DEVICE FOR MOTOR VEHICLES

Charles E. West, Buffalo, N.Y.

Continuation of application Serial No. 657,238, May 6, 1957. This application May 15, 1958, Serial No. 735,423

4 Claims. (Cl. 280—150)

This application is a continuation of my application Serial No. 657,238, now abandoned, and relates to a safety device designed and installable in a motor vehicle to restrain an occupant of the vehicle in a manner to prevent serious or fatal injury resulting from the occupant's body being forcibly thrown against parts of the vehicle during a sudden stop or a collision.

The safety devices heretofore provided have been objectionable in that they are more or less complicated and costly mechanisms which are either not adjustable or are difficult to adjust to suit the build of different users and in that they have not been designed to yield sufficiently under predetermined forces to prevent fatally injuring the user.

The objects of the present invention are to provide vehicles with a simple, inexpensive, readily installable and adjustable safety device which is adapted to engage and restrain a user's body in a manner to prevent the serious and fatal injuries which may result from forcible impact of the user's body with parts of the vehicle during a sudden stop or a collision; to provide a safety device which while light and strong is flexible and will yield under predetermined forces thereagainst to prevent serious and fatal injuries; to provide a safety device with a simple, effective and readily operable means for adjusting and locking the device in positions to suit the build of different persons; and to provide a safety device with simple and inexpensive pivotal joints allowing parts of the device to be secured to a fixed part and to a door of the vehicle whereby opening and closing movements of the door will automatically position the device to allow a user to enter and leave the vehicle.

In the drawings:

Figure 1 is a schematic top view of a portion of a motor vehicle having the usual seat, instrument panel and doors and equipped with the safety device of the present invention, the position of the device for restraining the user against injury causing movement being shown in full lines, and a position for allowing the user to enter and leave the vehicle being indicated in dot and dash lines.

Figure 2 is a schematic combined section and side elevational view of Figure 1.

Figure 3 is a fragmentary sectional view taken about on the line 3—3 of Figure 1 and shows the improved adjusting and locking means in an adjusted and locked position in full lines and in its unlocked adjustment allowing position in dot and dash lines.

Figure 4 is a fragmentary sectional view taken about on line 4—4 of Figure 1 and typifies the construction of the several pivoted joints of the device.

Figure 5 is a perspective view showing the adjusting and locking parts in separated relation to better illustrate their construction.

Figure 6 is a fragmentary plan view showing how the male parts of the adjacent ends of the pair of rear members are each formed and pivotally secured to the center rigid leg of the device.

Referring now to the drawings, Figures 1 and 2 schematically illustrate a portion of a motor vehicle 10 having a seat 11 carried by the floor 12, an instrument panel 13 and one of a pair of doors 14 all having the usual relation one to the other.

As shown in Figures 1 and 2 the vehicle 10 is equipped with the safety device 15 of the present invention which is preferably in the form of a somewhat double-U shaped tubular frame 16 having the rear end of its tubular center leg 17 and its tubular side legs 18, only one of which has been shown to simplify the drawing spaced and connected together by tubular members 19 to substantially span the space between the doors 14. The length of the legs 17 and 18 is such that when their forward ends are anchored to certain parts of the vehicle to extend rearwardly and downwardly therefrom at a predetermined angle, the members 19 carried by their rear ends overlie and are in spaced relation to the seat. With the frame 16 so positioned each of the tubular members 19 are positioned to extend across the thighs and abdomen of a person seated upon the seat 11 and during a sudden stop or a collision each act to resiliently restrain the resultant forward and upward motion of a person seated on the seat, thereby to prevent or greatly diminish the injuries which may result from a sudden stop or a collision.

In order to adjust and lock the frame 16 in positions for use by persons of different builds its legs 17 and 18 are each formed of an inner tubular section 21 upon which an outer tubular section 22 is telescopically fitted and which may be slid thereon to provide the desired position of the tubular members 19. Each of the sections 21 is formed with a row of alined, suitably spaced holes 23 to receive a finger 24 of a simple and effective device 25 swingably carried by the forward end of the section 22 and positionable to allow adjustment of the section 22 on the section 21 and positionable to lock the former on the latter. The devices 25 each consist of a plate-like body 26 formed midway between the reinforcing side flanges 27 with an oblong-ovate shaped hole 28 having the inwardly projecting finger 24 formed at one of its smaller ends and having a notch 29 formed at its opposite small end. The notch 29 is formed to receive a tongue 31 which projects forwardly from the upwardly and rearwardly inclined end 32 of the associated section 22 and which has its forward end bent outwardly and forwardly as at 33 to retain the plate against removal when the section 22 is telescopically mounted on the section 21. As shown in Figures 3 and 5 the forward end of the section 22 abuts the rear side of the plate 26 and due to the inclination of its end 32 allows the plate 26 to be swung from the full line locking position to the broken line adjusting position of Figure 3.

When the plate 26 is in the inclined locking position of Figure 3 the wall of the hole 28 grips the section 21 and prevents forward movement of the section 22 and it will be apparent that a forward force applied to the section 22, as by forward pressure against the tubular member 19, will tend to cause further inclination and increase the gripping action of the plate 26 on the section 21.

Assuming that the sections are locked together by the plate 26 and a different adjustment of the tubular member 19 is desired, the section 22 is slid rearwardly, thereby releasing the gripping engagement of the plate 26 with the section 21 and thereby swinging the plate 26 into the plane shown in broken lines in Figure 3. The plate 26 is then raised to disengage its finger 24 from the hole 23 and is held in its raised position to allow making the desired adjustment which when made, the finger 24 is inserted in a selected one of the holes 23 and the plate 26 is again swung to its adjustment locking position.

As stated above the forward ends of the legs 17 and 18 are secured to certain parts of the vehicle. As shown in Figure 1 the forward end of the section 21 of the center leg 17 is secured in a flanged socket 36 secured to the instrument panel 13 and the forward end of the section 21 of the side legs 18 are each pivotally connected as by a novel hinge construction 40 to be described, to an extension piece 37 which may be seated and secured in a socket of a strap member 38 secured to the door 14 by suitable fastening devices 39. The rear end of the section 22 of the leg 18 is also pivotally connected as by the hinge 40a to the outer end of the member 19 which has its inner end pivotally connected to the rear end of the section 22 of the center leg 17 as by the hinge 40b and by another hinge connection 41 whereby when the doors 14 are opened the legs 18 and the associated member 19 are moved to the dot and dash line position of Figure 1 to allow a person to enter the vehicle and sit upon the seat and to leave the vehicle.

The construction of the novel hinges 40, 40a and 40b is essentially the same as that shown in Figure 4 wherein the body parts 42 and 43 of the hinge are formed of strong, light plastic material which may be further strengthened by dispersing a suitable reinforcing material therein. The bodies of the part 42 and the part 43 each have a semi-circular cross section of a size to fit tightly in the end of the associated tubular section and are each formed with a circumferential groove 44 into which the wall 45 of the section is forced to provide an interlock between the body and the section. As shown in Figure 4 the inner end of each body may be provided with a conically shaped recess 46 to lighten it and the outer end of the bodies 42 and 43 are respectively formed as male and female parts 47 and 48 of the hinge. The male part 47 carries a suitable ball bearing 49 provided with an axle pin 51 whose ends project beyond the bearing and are seated in alined blind holes 52 formed in the opposite walls of the female part 48 to complete the hinge. To provide the simple, easily fabricated and easily assembled hinges 40, 40a and 40b their female parts each preferably consist of twin halves 48a and 48b which are formed to allow their holes 52 to be engaged over the projecting ends of the pin 51, thereby alining the assembled halves prior to inserting and securing them in the associated tubular member.

The hinge connection 41 as shown in Figures 1 and 4 is provided, as by forming the male part 47 of the hinges 40b with complementary hinge forming projecting lugs 54 each having a central hole 55 alineable to receive a hinge pin 56 formed to pivotally secure the parts 47 to the rear end of the leg 17.

The axis of the pin 56 of the hinge connection 41 is located normal to the axis of the pins 51 of the hinges 40, 40a and 40b to avoid binding of said hinges during movements of the frame between the positions described.

It should be understood that the herein shown and described form of the invention is intended to exemplify its principles and that various modifications of its component parts may be made within the scope of the appended claims.

I claim:

1. A safety device for motor vehicles having a seat, an instrument panel spaced forwardly of and above the seat and a door at each side end of the seat comprising a double-U shaped flexible tubular frame, said frame being formed of a pair of flexible tubular rear members, each having its opposite ends provided with a pivotal connection for pivotally connecting said ends to the rear ends of an adjacent pair of the forwardly extending tubular legs of the frame, said legs each being formed of tubular rear sections telescopically fitted upon tubular front sections for adjusting the length of the legs; means for locking each leg in an adjusted position, said means consisting of a plate swingably carried by the forward end of the rear section and formed to selectively intergage, embrace and grip the front section to prevent forward motion of the rear section, means for rigidly connecting the forward end of the center leg to the instrument panel, and means for pivotally connecting the forward end of each of the side legs to one of the doors to support the frame in a rearwardly and downwardly inclined position wherein each of its rear members are positioned to extend in slightly spaced relation to and across the thighs and abdomen of a person seated on the seat to restrain the person from the forward and upward motion resulting from a sudden stop or collision and whereby opening movement of the doors causes the associated leg and rear member to swing forwardly and inwardly to a position allowing a person to enter and leave the vehicle.

2. A safety device as set forth in claim 1 wherein the locking plate is reinforced by side flanges and is formed with a central oblong-ovate shaped hole, a finger projecting inwardly from one end of said hole is formed for selective engagement in any one of a row of spaced openings formed in the front section, said hole being shaped and of a size to allow the plate to be swung to a position wherein the wall of its hole embraces and grips the front section to prevent forward movement of the rear section and to allow the plate to be swung to another position wherein the finger is disengaged from the front section to allow the desired adjustment of the sections.

3. A safety device as set forth in claim 1 wherein the pivotal connections include a cooperating pair of reinforced plastic body members each formed to be partially inserted in and rigidly secured to the end portion of one of an adjacent pair of tubular members, the outer end of one of said body members being formed to receive a reduced projection of the other body member and to receive and retain the projecting ends of a pin of a bearing carried by said projection, thereby to provide a suitable hinge action between adjacent tubular members of the frame.

4. A safety device as set forth in claim 3 wherein the first named body member is formed of twin halves to facilitate its assembly with the other body member and the inner end portion of each body member is formed with a conically shaped opening to reduce the amount of plastic required.

References Cited in the file of this patent
UNITED STATES PATENTS

| | | |
|---|---|---|
| 2,322,755 | Voorhies | June 29, 1943 |
| 2,674,486 | Alderfer | Apr. 6, 1954 |
| 2,746,767 | Evans | May 22, 1956 |